Patented Aug. 4, 1931

1,817,005

UNITED STATES PATENT OFFICE

RUDOLF JAHODA AND LEON LILIENFELD, OF VIENNA, AUSTRIA; KLARA JAHODA AND ADELE RANKL, HEIRESSES OF RUDOLF JAHODA, DECEASED, ASSIGNORS TO LEON LILIENFELD, OF VIENNA, AUSTRIA

FLUORESCENT SCREEN FOR X-RAYS AND MATERIAL USED IN MAKING SAME

No Drawing. Application filed June 16, 1923, Serial No. 645,930, and in Austria July 29, 1922.

Zinc sulfide has been frequently used in making fluoroscopic and intensifying screens for X-rays. Nevertheless this material has not been generally adopted in radiology because screens made from it have two fundamental drawbacks, first transmitting and augmenting (intensifying) screens made from or containing zinc sulfide have a very long and intensive afterglow, and second the lighting power is considerably less than with screens made from other fluorescent substances such as for instance calcium tungstate or double salts of platinum. As a result the image on the translucent screen while clear enough is weak, and the photographs made with an augmenting screen made from zinc sulfide under the same conditions of exposure, time and intensity of the X-rays, are considerably thinner (weaker) than those made with an augmenting screen containing other fluorescent materials.

The present invention not only overcomes these drawbacks but makes it possible to produce a fluoroscopic or augmenting screen from zinc sulfide, which has no considerable afterglow and which gives photographs which surpass those made with screens containing other phosphorescent material in respect to vigour, pregnancy and richness in detail.

The present invention consists in treating the zinc to be used in making zinc sulfide with an amount of acid which, when it has dissolved zinc to its full capacity, will leave some of the zinc undissolved. In other words, an amount of zinc, chemically in excess over the amount of acid, is employed. The dissolved zinc is thereafter converted in known manner into sulfide. The latter is then used in making screens. The augmenting screens made from this material have excellent properties.

This discovery is extremely surprising since zinc is known to replace the metals in practically all solutions of metal salts, and one would expect that the presence of an excess of zinc when the zinc is dissolved in acid, would result in a thorough purification of the zinc salt solution. In other words one would expect that the above mentioned technical improvement ought to be due to the purity of the soluble zinc salt used in making the zinc sulfide which purity is the expected result of the excess of zinc which is present during the solution in acid. On the contrary however it is well known and has been repeatedly shown by experiment that screens containing zinc sulfide made from chemically pure zinc have the drawbacks enumerated above. This proves that the preparation of the zinc salt solution used in making zinc sulfide according to the present invention not only removes undesirable impurities, but also has an unexpected effect which gives the resulting zinc sulfide such valuable properties for use in translucent or augmenting screens.

We have also discovered that the characteristics of the above mentioned zinc sulfide which are particularly desirable for the present purpose can be even further improved:

1. If the calcined zinc sulfide is tested in X-rays and any portions of mass which do not exhibit fluorescence or which exhibit only a slight fluorescence are removed from the more active portions, by sorting. For this purpose the calcined zinc sulfide is inspected while illuminated by X-rays, either as a whole or in portions. Any portions which show sufficient fluorescence are used in making the translucent or augmenting screens. The rejected portions can be used in preparing fresh lots of zinc sulfide.

2. If the calcined zinc sulfide is thoroughly washed with water,

3. If the calcined zinc sulfide receives a sludging treatment (i. e. is converted into a slime or sludge in water and freed from coarser particles), or a washing, or decanting treatment, 2 and 3 can be carried out in a single operation, 4. If the salts of heavy metals which are essential parts of the phosphorescent centres are added before the soluble zinc salt is converted into zinc sulfide, 5. If the zinc sulfide is calcined at temperatures above 1000° C.

In practicing the present invention, zinc (preferably crude, i. e. not purified) or zinc refuse is treated with an acid (any of the acids which dissolve zinc readily) which dissolves zinc until all the acid is consumed, and reaction ceases, leaving a greater or less amount of zinc remaining undissolved. The dissolving operation may be carried out in the cold or heat may be used. The zinc salt solution is separated from the undissolved zinc by filtration or decanting, preferably after treatment with an oxidizing agent to oxidize any remaining iron, and to remove it by treatment with a basic substance, such as lime, sodium carbonate, ammonia or the like and then heated, the solution filtered if necessary. Small amounts of heavy metal salts are now added, such as salts of silver, bismuth, tungsten or the like, or two or more of these, and the solution is then precipitated with hydrogen sulfide, ammonium sulfide or a solution of another soluble sulfide.

The precipitation may be performed in the presence of an organic acid e. g. acetic or formic or a weaker acid, or in neutral or alkaline solution. The zinc sulfide is filtered, with suction if desired, washed and dried. The dried precipitate is preferably pulverized and then calcined. It is advisable to carry out the calcination in the absence of air. Before using it for making fluoroscopic or augmenting screens, the calcined precipitate should be inspected while being illuminated by X-rays and the portions showing little or no fluorescence should be removed and the precipitate then sludged to free it from coarser particles. The preparation of translucent or augmenting screens is carried out in the usual way, that is the zinc sulfide is either mixed with a binder and coated on a suitable carrier such as paper, cardboard, glass or a thin piece of wood, or else it is dusted on a support which has been coated with a binder or adhesive material or if desired the zinc sulfide can be mixed with a binder or plastic material and formed into films either by evaporating the solvent or by rolling. These films may be either rigid or flexible depending on the character and amount of the binder and whether or not any softeners have been added. The binders may be water-soluble as glue (gelatine), starch, tragacanth, tragasol, gum arabic, dextrine, albumen, casein, or water-insoluble as caoutchouc, guttapercha, balata, cellulose esters such as nitrocellulose, acetyl cellulose, formyl cellulose, viscose, cellulose ethers or the like, or resins both natural and artificial. The amount of binder should in ordinary cases, be less than the amount of zinc sulfide, the ratio of binder to zinc sulfide can be varied between wide limits, depending on the particular binder used, and other factors. As a rule the smaller the amount of binder the better the fluoroscopic or augmenting screen but the invention is not restricted to this.

Zinc sulfide can be used alone for making fluoroscopic or augmenting screens or it may be used in admixture with small amounts of heavy metals for example silver, bismuth, tungsten, uranium, lead or the like, or their sulfides or other compounds or mixed with other fluorescent substances such as calcium tungstate or double salts of platinum or the like, or it may be mixed with both groups.

In the claims the words "fluorescent screen" are intended to cover fluoroscopic and augmenting screens for X-rays.

*Example*

Crude zinc (e. g. commercial zinc, zinc scrap, old zinc ware, spelter, zinc residues) is dissolved in an acid such as hydrochloric acid and this solution is warmed with an excess of zinc and then allowed to stand for several hours. More zinc is used than the amount of acid present can dissolve. If chemically pure zinc is used, a few pieces of crude commercial zinc should be dissolved with it or used as an excess.

After cooling (and filtration if desired) any iron remaining in the solution is removed in the usual way after oxidation (for instance by bromine or potassium permanganate) by precipitation with hot caustic alkalies, or alkaline earth oxides or hydroxides, or alkali metal carbonates. These are added until some zinc hydroxide or carbonate or both, which precipitate, remain undissolved.

After filtration, heavy metals are added in the form of their salts in quantities from 0.0001 to 0.0015 parts, for example 0.0015 parts of bismuth in the form of its nitrate or 0.0001 parts of silver in the form of ammoniacal solution of silver chloride to 1 part of zinc give sensitive X-ray screens. Tungsten, uranium, copper or mixtures of these with each other or with other metals can also be used, for example in the form of their salts.

The solution prepared as above is brought to a boil and precipitated with a clear filtered barium or strontium sulfide solution.

The precipitation can also be effected with hydrogen sulfide, alkali metal sulfides or ammonium sulfide, these last are particularly advisable where the anion of the zinc solution forms insoluble precipitates with the alkaline earth metals (e. g. sulfates). When alkali metal sulfides are used, care must be taken not to introduce iron as an impurity, this can be avoided by boiling dilute solutions of the sulfides for some time and filtration, which results in complete elimination of iron.

The precipitation can also be carried out in the cold but then the precipitate settles slowly and is not so easily filtered. Preferably the precipitation should be incomplete and the filtrate should show decided traces of zinc. After settling, the zinc sulfide is filtered by suction or centrifuging, and dried at once or after a single washing. The mass is then calcined in a crucible preferably without access of air, for example in an inert atmosphere or in a vacuum preferably at a temperature between 1000 and 1200° C. After a temperature of at least 1000° C. has been reached the calcination should not be continued too long as otherwise there is a considerable diminution of fluorescence and in some cases it may be entirely lost.

After cooling, the contents of the crucible are inspected by X-light and the inactive or less active portions (such as portions of the mass which were next to the crucible walls) are removed from the more active portions. The selected portions are then treated with hot water and sludged, which separates the less fluorescent coarse particles. The sludging is preferably performed in a sludging apparatus or washing apparatus for instance in sludging funnels by means of running water.

The sludged mass is filtered by suction and preferably dried at 100° C. or over.

The finished product is intimately mixed with a plastic binder such as a solution of cellulose acetate or a solution of a cellulose ether, in the proportion of say 10 to 30 parts of dry zinc sulfide to 1 part of the air-dry binder.

The amount of the binder may vary depending on the quality of screen desired. The consistency of the mixture should also be adapted to the method to be used, that is if the film is to be poured the solution should be thinner than if it is to be coated or brushed on.

The mixture containing zinc sulfide with the binder is then worked up into fluoroscopic or augmenting screens in the usual way that is it may be poured or rolled into films or suitable carriers such as paper, cardboard, etc. may be coated with it.

In place of dissolving zinc in acid, a solution of a commercial zinc salt, e. g. zinc chloride can be used. Such a solution is first treated with some commercial (crude or impure) zinc, and a few drops, or more, of hydrochloric or other acid can be added. The metallic zinc added should be in excess in all cases. The solution is thereafter treated as above.

Cellulose ethers, especially those soluble in organic solvents made for example according to the process of a prior U. S. patent issued to one of us, No. 1,188,376, or made in any other suitable manner, form excellent binders. These may be used without or with plasticizing agents such as oils, fats, camphor, high boiling esters, for example phosphoric esters of the phenols, high boiling ethers, high boiling hydrocarbons, glycerine and the like, and with a suitable solvent such as benzol, benzol-alcohol mixture, alcohol, methyl alcohol, chloroform-alcohol mixture, methyl alcohol-methyl acetate mixture, acetylene dichloride-alcohol mixture, acetylene dichloride-benzol-alcohol mixture and the like. For example a 5 to 10 per cent. solution of a cellulose ether insoluble in water, but soluble in organic solvents in a mixture of methyl alcohol and methyl acetate may be used. The zinc sulfide, prepared, sorted and sludged, as above, is then added. This mixture can be made into films or brushed, flowed or otherwise coated on a base (as above specified) and dried, say at room temperature or 100° C. or above.

We claim:

1. A fluorescent screen for X-rays which contains zinc sulfide and at least one other fluorescent substance, and has no considerable afterglow.

2. A fluorescent screen for X-rays which contains zinc sulfide and at least one other metal sulfide, and has no considerable afterglow.

3. A fluorescent screen for X-rays which contains zinc sulfide and at least one metal, and has no considerable afterglow.

4. A fluorescent screen for X-rays which contains zinc sulfide and silver sulfide, and has no considerable afterglow.

5. A fluorescent screen for X-rays which contains zinc sulfide and in addition at least one other fluorescent substance and another metal sulfide, and has no considerable afterglow.

6. A fluorescent screen for X-rays which contains that form of zinc sulfide that has no considerable afterglow and a cellulose ether as a binder.

7. A fluorescent screen for X-rays which contains zinc sulfide of a kind having no considerable afterglow, a cellulose ether and a plasticizing agent, such screen having no considerable afterglow.

In testimony whereof we have hereunto set our hands.

RUDOLF JAHODA,
LEON LILIENFELD.